(12) United States Patent
Danielsson et al.

(10) Patent No.: US 8,183,535 B2
(45) Date of Patent: May 22, 2012

(54) SILICON DETECTOR ASSEMBLY FOR X-RAY IMAGING

(75) Inventors: Mats Danielsson, Täby (SE); Staffan Karlsson, Kista (SE)

(73) Assignee: Mats Danielsson, Taby (SE)

( * ) Notice: Subject to any disclaimer, the term of this patent is extended or adjusted under 35 U.S.C. 154(b) by 521 days.

(21) Appl. No.: 12/488,930

(22) Filed: Jun. 22, 2009

(65) Prior Publication Data

US 2010/0204942 A1    Aug. 12, 2010

Related U.S. Application Data

(60) Provisional application No. 61/151,637, filed on Feb. 11, 2009.

(51) Int. Cl.
*G01T 1/24* (2006.01)
(52) U.S. Cl. .................................. 250/370.09
(58) Field of Classification Search .......... 250/370.01, 250/370.08, 370.09
See application file for complete search history.

(56) References Cited

U.S. PATENT DOCUMENTS

| | | | |
|---|---|---|---|
| 5,434,417 | A | 7/1995 | Nygren |
| 5,821,540 | A | 10/1998 | Sato et al. |
| 2002/0017609 | A1 | 2/2002 | Danielsson |
| 2002/0018543 | A1 | 2/2002 | Danielsson |

FOREIGN PATENT DOCUMENTS

| | | |
|---|---|---|
| DE | 4025427 | 2/1992 |
| DE | 19618465 | 8/1997 |
| WO | WO 0068710 A2 | 11/2000 |

OTHER PUBLICATIONS

U.S. Appl. No. 12/707,076, filed Feb. 17, 2010; Inventor: Bornefalk et al.
P. Shikhaliev, *Projection X-ray Imaging with Photon Energy Weighting: Experimental Evaluation with a Prototype Detector*, Phys. Med. Biol. 54 (2009), pp. 4971-4992.
R. Alvarez et al., *Energy-Selective Reconstructions in X-ray Computerized Tomography*, Phys. Med. Biol., 1976, vol. 21, No. 5, pp. 733-744.
W. Barber et al., *Characterization of a Novel Photon Counting Detector for Clinical CT: Count Rate, Energy Resolution, and Noise Performance*, Medical Imaging 2009: Physics of Medical Imaging.

(Continued)

*Primary Examiner* — Mark R Gaworecki
(74) *Attorney, Agent, or Firm* — Nixon & Vanderhye P.C.

(57) ABSTRACT

A Silicon detector for x-ray imaging is based on multiple semiconductor detector modules (A) arranged together to form an overall detector area, where each semiconductor detector module includes an x-ray sensor of crystalline Silicon oriented edge-on to incoming x-rays and connected to integrated circuitry for registration of x-rays interacting in the x-ray sensor through the photoelectric effect and through Compton scattering and for an incident x-ray energy between 40 keV and 250 keV to provide the spatial and energy information from these interactions to enable an image of an object. Further, anti-scatter modules (B) are interfolded between at least a subset of the semiconductor detector modules to at least partly absorb Compton scattered x-rays.

27 Claims, 15 Drawing Sheets

OTHER PUBLICATIONS

M. Brigida et al., *A New Monte Carlo Code for Full Simulation of Silicon Strip Detectors*, Nuclear Instruments and Methods in Physics Research A 533 (2004), pp. 322-343.

R. Cahn et al., *Detective Quantum Efficiency Dependence on X-ray Energy Weighting in Mammography*, Medical Physics, vol. 26, No. 12, Dec. 1999, pp. 2680-2683.

R. Nowotny, *Application of Si-Microstrip-Detectors in Medicine and Structural Analysis*, Nuclear Instruments and Methods in Physics Research 226 (1984), North-Holland, Amsterdam, pp. 34-39.

J.P. Schlomka et al., *Experimental Feasibility of Multi-Energy Photon-Counting K-Edge Imaging in Pre-Clinical Computed Tomography*, Phys. Med. Biol. 53 (2008), pp. 4031-4047.

T. Schmidt, *Optimal "Image-Based" Weighting for Energy-Resolved CT*, Medical Physics, vol. 36, No. 7, Jul. 2009, pp. 3018-3027.

International Search Report and Written of the International Searching Authority mailed Apr. 14, 2010 in corresponding Application No. PCT/SE2010/050106.

Beuville, E. et al., "High Resolution X-ray Imaging Using a Silicon Strip Detector", IEEE transactions on Nuclear Science, vol. 45, No. 6, Dec. 1998, p. 3059-3063.

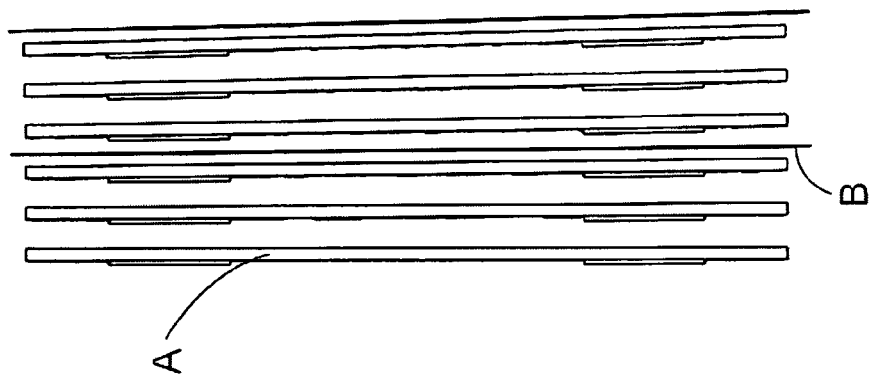
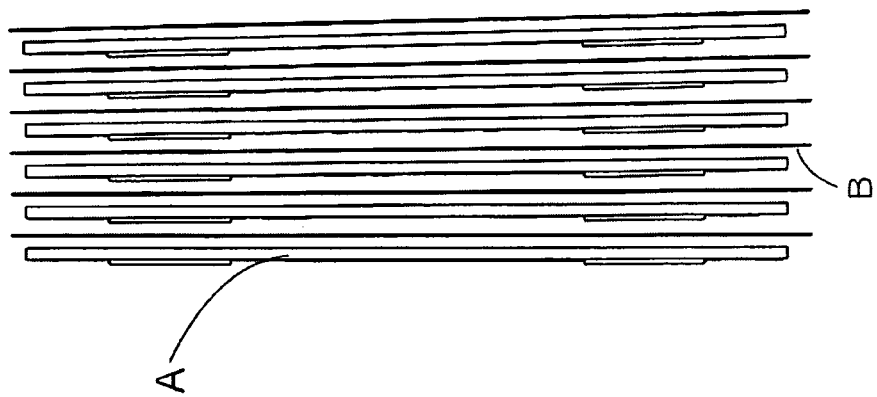
Fig 7

Fig 10a
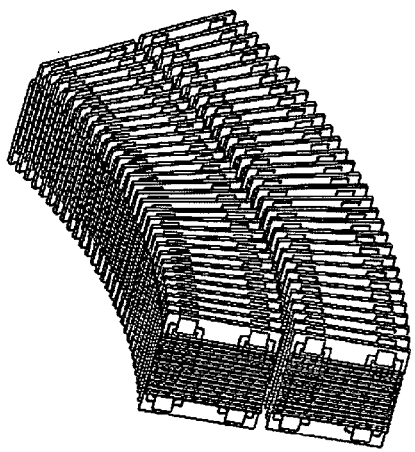

Fig 11
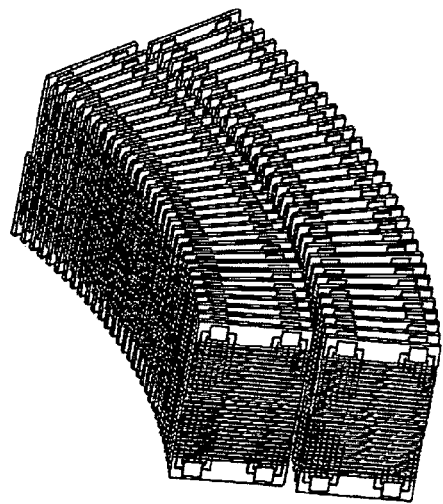

SILICON DETECTOR ASSEMBLY FOR X-RAY IMAGING

TECHNICAL FIELD

The present invention relates to x-ray imaging and more particularly to a silicon detector assembly for x-ray imaging.

TECHNICAL BACKGROUND

X-ray imaging is a common procedure, in medical imaging the energy range for the x-rays is typically 10 keV to 200 keV, in non-destructive testing or security screening the energy may be higher. In this range the x-rays reacts with matter mainly through Compton effect and Photoelectric effect. In the first case only a part of the energy of the x-ray photon is passed on to the electron and the x-ray continues with decreased energy after this scattering event. In the latter case all the energy is passed to the electron and the x-ray is completely absorbed.

The challenge for x-ray imaging detectors is to extract maximum information from the detected x-rays to provide input to an image of an object where the object is depicted in terms of density, composition and structure. It is still common to use film-screen as detector but mostly the detectors today provide a digital image.

The detector needs to convert the incident x-rays into electrons, this typically take place through Photo-effect or through Compton interaction and the resulting electron are usually creating secondary visible light until its energy is lost and this light is in turn detected by a photo-sensitive material. There are also detectors, less common, which are based on semiconductors such as amorphous Selenium or Silicon and in this case the electrons created by the x-ray is creating electric charge in terms of electrons and hole-pairs which are collected through an applied electric field with enough strength.

By far the most detectors operate in an integrating mode in the sense that they integrate the signal from a multitude of x-rays and this signal is only later digitized to retrieve a best guess for the number of incident x-rays in a pixel. The last years also so called photon counting detectors have emerged as a feasible alternative in some applications; currently those detectors are commercially available mainly in mammography. The photon counting detectors have an advantage since in principal the energy for each x-ray can be measured which yields additional information about the composition of the object; which can be used to increase the image quality and/or to decrease the radiation dose.

A very common configuration for the detector is as outlined in U.S. Pat. No. 7,471,765 "Cone Beam Computed Tomography With A Flat Panel Imager". The detector incorporates a 512.times.512 array of a-Si:H photodiodes and thin-film transistors coupled to a scintillators and is operated in integration mode. In this case the application is to optimize radiation therapy but these detectors are also very common place in diagnostic imaging and other applications.

In U.S. Pat. No. 4,785,186 it is proposed an amorphous silicon detector for counting high energy particles including x-rays. U.S. Pat. No. 7,471,765 "Cone Beam Computed Tomography with A Flat Panel Imager". This innovation was not exploited for x-ray imaging, maybe because of challenges with the amorphous silicon material in this application and also probably because of challenges with absorption efficiency.

Since in Photon Counting mode the signal from an individual x-ray is quite weak you need to maximize it by optimizing the conversion efficiency from x-ray energy into collected electric charge for each event. This means the use of Crystalline materials in detector is normally advisable. The advantages and the pit-falls with photon counting is described in Börje Norlin, "Characterisation and application of photon counting X-ray detector systems" Mid Sweden University Doctoral Thesis 26, ISSN 1652-893X, ISBN 978-91-85317-55-4 Electronics Design Division, in the Department of Information Technology and Media Mid Sweden University, SE-851 70 Sundsvall, Sweden and also in Mats Lundqvist Mats Lundqvist: Silicon Strip Detectors for Scanned Multi-Slit X-Ray Imaging. Both of the thesis concerns the development and characterization of X-ray imaging systems based on single photon processing. One can compare measuring the energy of each x-ray to seeing the color of the x-ray, analogous to color imaging in the visible range. "Color" X-ray imaging opens up new perspectives in medical X-ray diagnosis and other applications. The difference in absorption for different colors can be used to discern materials in the object and in principle the elemental composition of an object could be determined and not only the gray scale. For instance, this information might be used to identify contrast media which is used in a large number of examinations in diagnostic x-ray imaging.

Lundqvist and Norlin point out that today's technology make it possible to construct photon counting detector systems that can resolve details to a level of approximately 50 µm. However, there is also a complication with such small pixels since in a semiconductor detector each absorbed X-ray photon creates a cloud of charge which contributes to the image. For high photon energies the size of the charge cloud is comparable to 50 µm and might be distributed between several pixels in the image. Charge sharing is a key problem since, not only is the resolution degenerated, but it also destroys the "color" information in the image. They also outline methods to get around this problem, such as charge summing between adjacent pixels.

A suggestion for a detector for computed tomography for breast imaging is outlined in M. G. Bisogni, A. Del Guerra, N. Lanconelli, A. Lauria, G. Mettivier, M. C. Montesi, D. Panetta, R. Pani, M. G. Quattrocchi, P. Randaccio, V. Rosso and P. Russo "Experimental study of beam hardening artifacts in photon counting breast computed tomography" Nuclear Instruments and Methods in Physics Research Section A: Accelerators, Spectrometers, Detectors and Associated Equipment Volume 581, Issues 1-2, 21 Oct. 2007, Pages 94-98 This is an example where the energies are so low that Silicon can be used as a detector still maintaining some of the detector efficiency. The X-ray breast Computed Tomography (CT) system is implemented on the gantry of a dedicated single photon emission tomography system for breast Tc-99 imaging. The single photon counting silicon pixel detector was 0.3 mm thick, 256×256 pixel, 55 µm pitch, bump-bonded to the Medipix2 photon counting readout chip. Artifacts may be due to the low detection efficiency and the charge sharing effect of the silicon pixel detector.

Another photon counting detector for low energies is proposed by V. Rosso, N. Belcari, M. G. Bisogni, C. Carpentieri, A. Del Guerra, P. Delogu, G. Mettivier, M. C. Montesi, D. Panetta, M. Quattrocchi, P. Russo and A. Stefanini "Preliminary study of the advantages of X-ray energy selection in CT imaging" Nuclear Instruments and Methods in Physics Research Section A: Accelerators, Spectrometers, Detectors and Associated Equipment, Volume 572, Issue 1, 1 Mar. 2007, Pages 270-273. This detector ensures good detection efficiency (46%) in the used energy range (60 kVp) with a good spatial resolution that arises from a 55 µm square pixel.

Silicon have many advantages as detector material such as high purity and a low energy required for creation of charge carriers (electron-hole pairs) and a also a high mobility for these charge carriers which means it will work even for high rates of x-rays. Not the least it is also readily available in large volumes.

The main challenge with Silicon is its low atomic number and low density which means it has to be made very thick for higher energies to be an efficient absorber. The low atomic number also means the fraction of Compton scattered x-ray photons in the detector will dominate over the Photo absorbed photons which will create problem with the scattered photons since they may induce signals in other pixels in the detector which will be equivalent to noise in those pixels. Silicon has however been used successfully in applications with lower energy as is for example outlined by M. Danielsson, H. Bornefalk, B. Cederström, V. Chmill, B. Hasegawa, M. Lundqvist, D. Nygren and T. Tabár, "Dose-efficient system for digital mammography", Proc. SPIE, Physics of Medical Imaging, vol. 3977, pp. 239-249 San Diego, 2000. One way to overcome the problem of low absorption efficiency for Silicon is to simply make it very thick, the Silicon is produced in wafers which are approximately 500 μm thick and these wafers can be oriented so that the x-rays are incident edge-on and the depth of silicon may be as much as the diameter of the wafer if required.

Another method to make Silicon deep enough to get high efficiency is advocated in U.S. Pat. No. 5,889,313 Sherwood Parker "Three dimensional architecture for solid state radiation detectors" 1999, this is an inventive method but involves some non standard production methods which may be the reason why it has not been used in commercial imaging detectors.

The first mentioning of crystalline Silicon strip detectors in edge-on geometry as an x-ray detector we could find is R. Nowotny: "Application Of Si-Microstrip-Detectors In Medicine And Structural Analysis" Nuclear Instruments and Methods in Physics Research 226 (1984) 34-39. It concludes that Silicon will work at low energies such as for breast imaging but not for higher energies such as computed tomography mainly because of the higher fraction of Compton scattering and problems related to this.

The edge-on geometry for semiconductor detectors is also suggested in U.S. Pat. No. 4,937,453 Robert Nelson "X-ray detector for radiographic imaging" (edge-on), U.S. Pat. No. 5,434,417 David Nygren "High resolution energy-sensitive digital X-ray" and US2004/0251419 patent application by Robert Nelson. In the US2004/0251419 patent application edge-on detectors are used for so called Compton imaging, in which the energy and direction of the Compton scattered x-ray is measured in order to make an estimation of the energy of the original x-ray. The method of Compton imaging has been much discussed in the literature for a long time but mainly applies to energies higher than what is employed in x-ray imaging, such as Positron Emission Tomography. Compton imaging does not relate to the present invention.

In a paper by S Shoichi Yoshida, Takashi Ohsugi "Application of silicon strip detectors to X-ray computed tomography" Nuclear Instruments and Methods in Physics Research A 541 (2005) 412-420 an implementation of the edge-on concept is outlined. In this implementation thin tungsten plates placed between edge-on silicon strip detector reduces the background of scattered X-rays and improve the image contrast with low dose. The implementation is very similar to what is proposed by R. Nowotny: "Application Of Si-Microstrip-Detectors In Medicine And Structural Analysis" Nuclear Instruments and Methods in Physics Research 226 (1984) 34-39.

Several proposals have been made for photon-counting semiconductor detectors based on high-Z materials such as CdZnTe and clinical images have also been acquired with prototype detectors. The drawback with these materials is the cost and lack of experience in production volumes.

There has been a considerable interest in photon counting detectors in particular for medical imaging but so far there is no working commercial solution at higher energies than around 40 keV. This is because of problems to manufacture detectors in feasible and readily available materials; exotic high Z semiconductors are still expensive and unproven. Silicon has worked for lower energies but for higher energies the problem of high fraction of Compton scatter has been a prohibitive problem together with a working system assembly of a detector that fulfills the geometrical requirements of for example today's CT modalities in terms of combining high detection efficiency in terms of geometry and absorption.

SUMMARY

It is a general object to provide a silicon detector assembly for x-ray imaging.

This object is met by the invention as defined by the accompanying patent claims.

A basic idea is to provide a Silicon detector for x-ray imaging that is based on multiple semiconductor detector modules arranged together to form an overall detector area. Each semiconductor detector module comprises an x-ray sensor of crystalline Silicon oriented edge-on to incoming x-rays and connected to integrated circuitry for registration of x-rays interacting in the x-ray sensor through the photoelectric effect and through Compton scattering and for an incident x-ray energy between 40 keV and 250 keV to provide the spatial and energy information from these interactions to enable an image of an object. Further, anti-scatter modules are interfolded between at least a subset of the semiconductor detector modules to at least partly absorb Compton scattered x-rays.

Preferably, each anti-scatter module includes a foil of relatively heavy material to prevent most of the Compton scattered x-rays in a semiconductor detector module to reach an adjacent detector module.

By way of example, in an advantageous implementation, each of the semiconductor detector modules is implemented as a Multi Chip Module (MCM), and the integrated circuitry comprises at least two integrated circuits, which are mounted by a flip-chip technique. It should though be understood that it is possible to employ implementations, where the semiconductor detector module only has a single integrated circuit.

In summary the present invention will overcome these problems which may make photon counting detectors a reality also in applications with higher x-ray energies.

The invention can be used in many different applications including computer tomography, security scanning and non-destructive testing.

Other advantages and features offered by the present invention will be appreciated upon reading of the following description of the embodiments of the invention.

BRIEF DESCRIPTION OF DRAWINGS

The invention, together with further objects and advantages thereof, may best be understood by making reference to the following description taken together with the accompanying drawings, in which:

FIG. 7 is a schematic diagram illustrating different examples of how semiconductor detector modules can be positioned next to each other with anti-scatter sheets positioned in-between detector modules.

FIGS. 10a-c are different schematic views illustrating an example of the arrangement of semiconductor detector modules in two levels (B) to allow for seamless tiling of the semiconductor detector modules.

FIG. 11 is a schematic diagram illustrating an example of how a full detector can be constructed in two halves and assembled together seamlessly in order to build a wider detector.

DETAILED DESCRIPTION

A basic idea is to provide a Silicon detector for x-ray imaging that is based on multiple semiconductor detector modules arranged together to form an overall detector area, where each semiconductor detector module comprises an x-ray sensor of crystalline Silicon oriented edge-on to incoming x-rays and connected to integrated circuitry for registration of x-rays interacting in the x-ray sensor through the photoelectric effect and through Compton scattering and for an incident x-ray energy between 40 keV and 250 keV to provide the spatial and energy information from these interactions to enable an image of an object. Further, anti-scatter modules are interfolded between at least a subset of the semiconductor detector modules to at least partly absorb Compton scattered x-rays.

As mentioned, semiconductor detector modules, each including an x-ray sensor, are tiled together to form a full detector of almost arbitrary size with almost perfect geometrical efficiency except for an anti-scatter grid which is integrated between at least some of the semiconductor detector modules. The x-ray sensors are attached to integrated circuits which use the information both from x-rays that Compton scatter in the sensors and from x-rays which reacts through photo-effect. This information is used to reconstruct the final image with optimum contrast for a certain imaging task. Preferably, the energy for each x-ray can be deduced with the combined information of the deposited energy in the semiconductor sensor and the depth of interaction for the x-ray. The anti-scatter grid which normally is made of a relatively heavy material not only cut Compton scattered x-rays from the object but also prevents Compton scattered x-rays in the semiconductor sensors to reach other sensors. These Compton scattered x-rays would otherwise mainly add to the noise.

Preferably, each anti-scatter module includes a foil of relatively heavy material to prevent most of the Compton scattered x-rays in a semiconductor detector module to reach an adjacent detector module.

Figure 1:
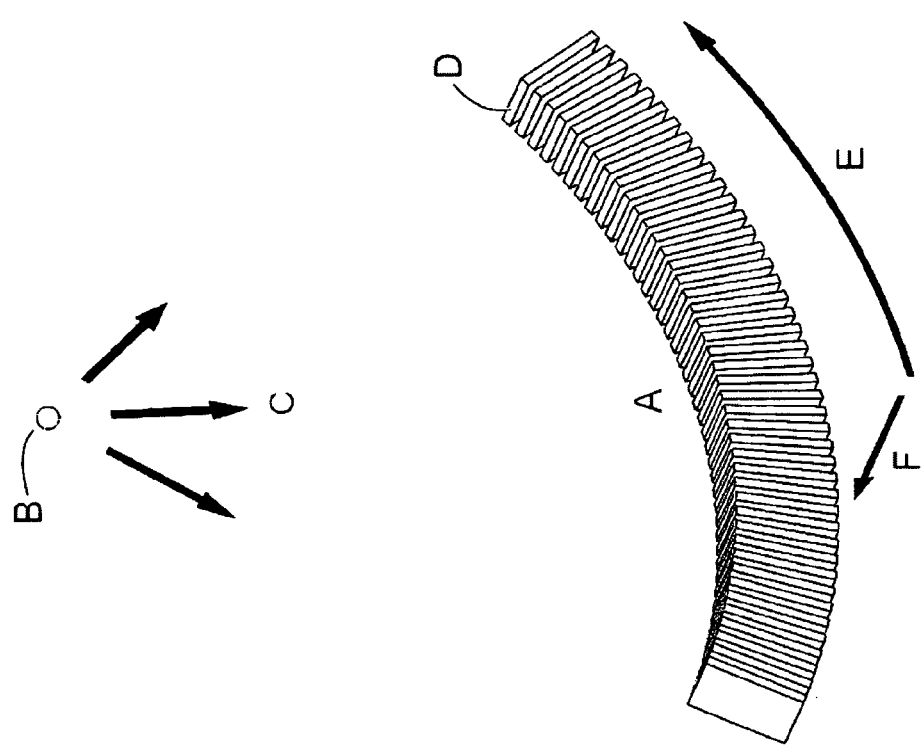
FIG. 1 is a schematic diagram of an X-ray detector according to an exemplary embodiment.

FIG. 1 is a schematic diagram of an X-ray detector according to an exemplary embodiment. In this example there is shown a schematic view of an X-ray detector (A) with x-ray source (B) emitting x-rays (C). The elements of the detector (D) are pointing back to the source, and thus preferably arranged in a slightly curved overall configuration. Two possible scanning motions (E, F) of the detector are indicated. In each scanning motion the source may be stationary or moving, in the scanning motion indicated by (E) the x-ray source and detector may be rotated around an object positioned in between. In the scanning motion indicated with (F) the detector and the source may be translated relative to the object, or the object may be moving, e.g. if it is positioned on a conveyor belt. Also in scan motion (E) the object may be translated during the rotation, so called spiral scanning.

In a preferred embodiment semiconductor sensors made of Crystalline Silicon are used to convert the x-rays into an electric signal. To absorb the x-rays the sensor is oriented edge-on to the incoming x-rays and the depth should be enough to absorb at least more than 50% of incoming x-rays, for an application in Computed Tomography the depth should be around 30 mm. The semiconductor sensor is around 0.5 mm thick and is preferably subdivided into pixels and each pixel is formed, e.g. by a back-biased diode which should be fully depleted in so that the whole volume works as sensor for the x-rays. In an exemplary application, the width of the pixels may be around 0.4 mm. In a preferred exemplary embodiment, each pixel diode should be subdivided into depth segments to decrease the count rate, the length of these depth segments should preferably vary exponentially to make sure that the detection rate, which decreases exponentially with depth, is kept approximately even.

Figure 2:
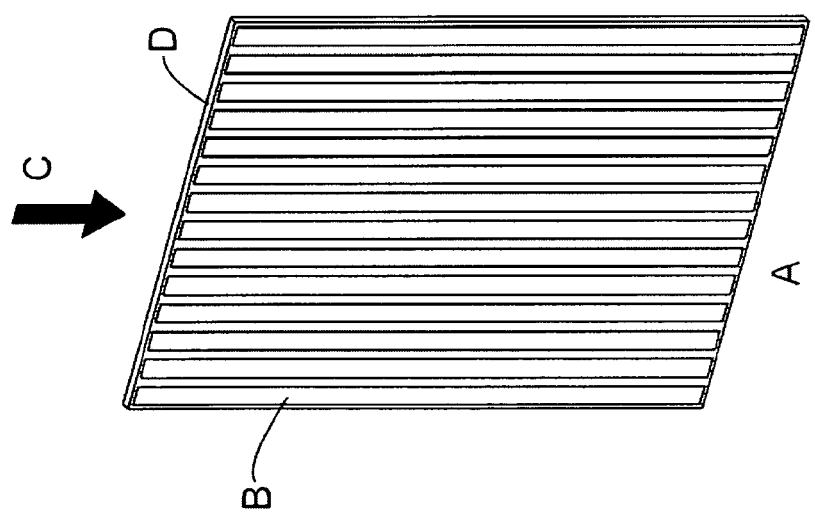
FIG. 2 is a schematic diagram illustrating an example of a semiconductor detector module according to an exemplary embodiment.

FIG. 2 is a schematic diagram illustrating an example of a semiconductor detector module according to an exemplary embodiment. This is an example of a semiconductor detector module (A) with the sensor part split into pixels (B), where each sensor pixel is constituted, e.g. by a diode. The x-rays (C) enter through the edge (D) of the semiconductor sensor.

Figure 3:
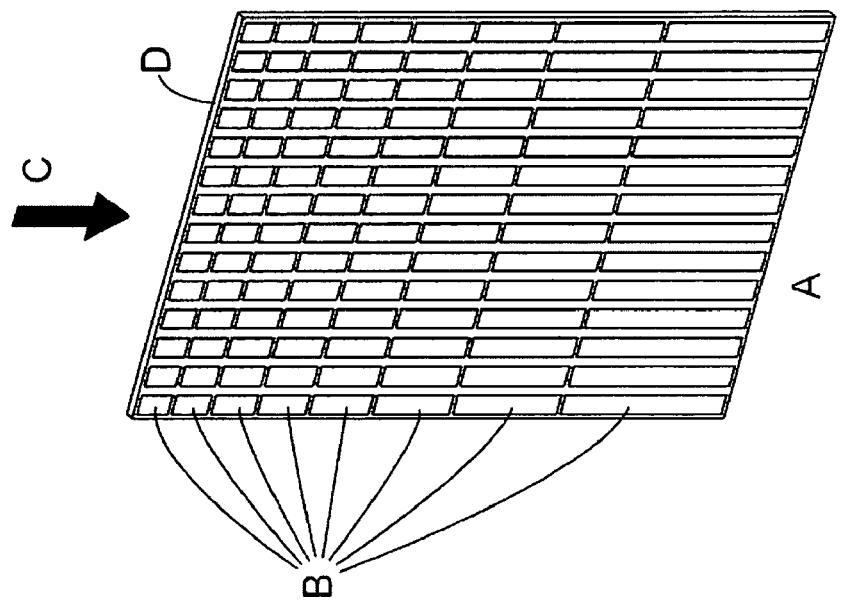
FIG. 3 is a schematic diagram illustrating an example of semiconductor detector module according to another exemplary embodiment.

FIG. 3 is a schematic diagram illustrating an example of semiconductor detector module according to another exemplary embodiment. In this example, the semiconductor detector module sensor part (A) is split into pixels (B) where each sensor pixel is constituted by a diode. In this case the semiconductor sensor part is also split into so-called depth segments in the depth direction, again assuming the x-rays (C) enter through the edge (D).

The semiconductor sensors may also be used as so called Multi Chip Modules in the sense that they are used as base substrates for electric routing and for a number of Application Specific Integrated Circuits (ASICs) which are attached preferably through so called flip-chip technique. The routing will include a connection for the signal from each pixel to the ASIC input as well as connections from the ASIC to external memory and/or digital data processing. Power to the ASICs may be provided through similar routing taking into account the increase in cross-section which is required for the large currents in these connections, but the power may also be provided through a separate connection. The ASICS are positioned on the side of the active sensor and this means it can be protected from the incident x-rays if an absorbing cover is placed on top and it can also be protected from scattered x-rays from the side by positioning an absorber also in this direction. This may be important since x-rays may harm the ASICs and cause errors both in short and long term, mainly through charge up of oxide layers in the ASIC.

In a preferred exemplary embodiment, the ASICs are Silicon-based and manufactured through Complementary Metal Oxide Semiconductor (CMOS) technology.

Figure 4:
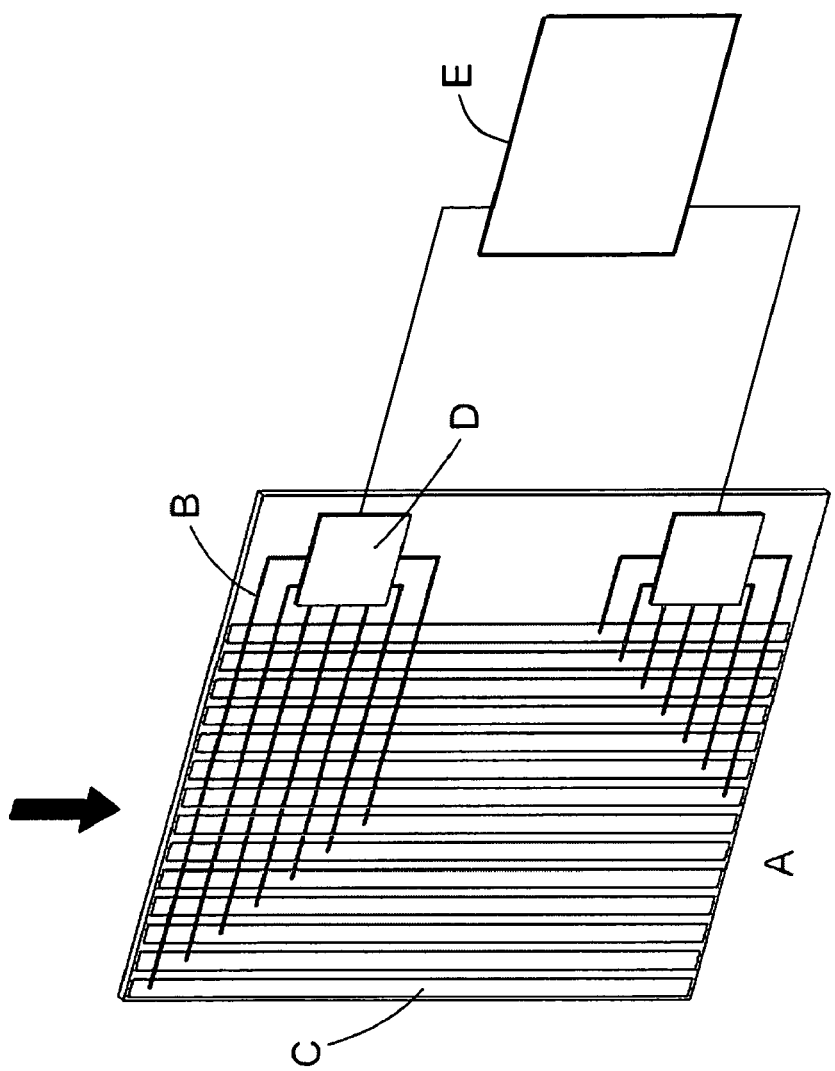
FIG. 4 is a schematic diagram illustrating a semiconductor detector module implemented as a multi chip module according to an exemplary embodiment.

FIG. 4 is a schematic diagram illustrating a semiconductor detector module implemented as a multi chip module according to an exemplary embodiment. This example shows how the semiconductor sensor also can have the function of substrate (A) in a Multi Chip Module (MCM). The signal is routed (B) from the pixels (C) to inputs of parallel processing integrated circuits (e.g. ASICs) (D) which are positioned next to the active sensor area. It should be understood that the term Application Specific Integrated Circuit (ASIC) is to be interpreted broadly as any general integrated circuit used and configured for a specific application. The ASICs process the electric charge generated from each x-ray and converts it to digital data which can be used to estimate the energy. The ASICs are configured for connection a digital data processing circuitry so the digital data may be sent to further digital data processing (E) and memories located outside of the MCM and finally the data will be the input to the reconstructed image.

In the ASICs the signal from each x-ray is measured and the deposited energy by each x-ray is estimated. The measured energy of each x-ray will be used to increase the contrast of desired elements in the image. To achieve this, energy information will be used to separate electronic noise from x-rays which Compton scatters in the semiconductor sensor from x-rays which react through photo effect. The information will preferably be weighted together to maximize the contrast for desired elements and structures in the object. There will also be some energy information from the measurement of the depth of interaction for the x-ray, which is performed since may keep track of which depth segment the x-ray converted. This is particularly important for the Compton scattered x-rays in the detector since for these x-rays the energy will be more uncertain since only a part of the original energy was deposited in the semiconductor sensor.

For smaller pixels it may be necessary to take into account charge sharing between pixels which, if not corrected for, will deteriorate the information for these events since one event will otherwise be mistaken for two events with lower energy.

The combination of the ASIC electronics and semiconductor sensors should ideally have a non-paralyzable dead time short enough to keep up with high flux of x-rays and avoid so called pile-up which means that two events will be mistaken for one event with the combined energy of the two contributing events. The dead time can be corrected for in order not to create artifacts in the image but will mean a loss of image quality and should be kept as low as possible. It is possible to discriminate the pile-up events with an energy exceeding the maximum energy of the incident x-rays since this is physically impossible.

Figure 5:
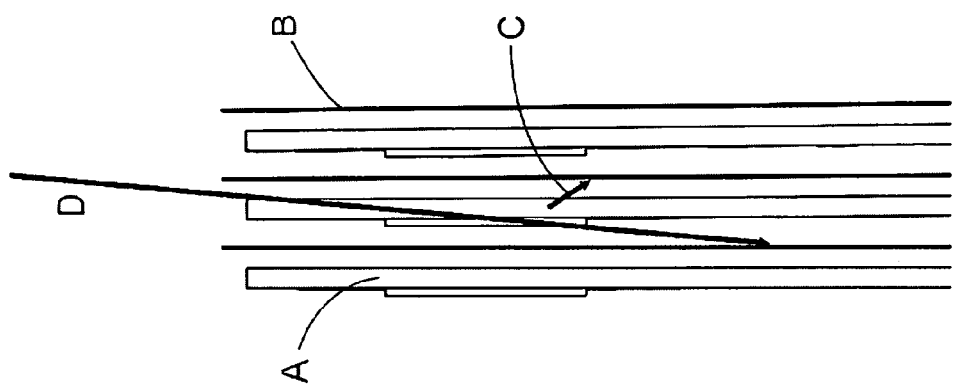
FIG. 5 is a schematic diagram illustrating an example of how several semiconductor detector modules can be positioned next to each other in order to build a whole x-ray detector.

FIG. 5 is a schematic diagram illustrating an example of how several semiconductor detector modules can be positioned next to each other in order to build a whole x-ray detector. In this particular example, several Multi Chip Modules (MCMs) (A) according to FIG. 4 are positioned next to each other in order to build a whole x-ray detector. The MCMs are interfolded by sheets of a heavy element (such as Tungsten) (B) in order to absorb x-rays which were Compton scattered in the semiconductor sensors (C) or in the object (D), these x-rays would otherwise contribute to the noise in the image.

Figure 6:
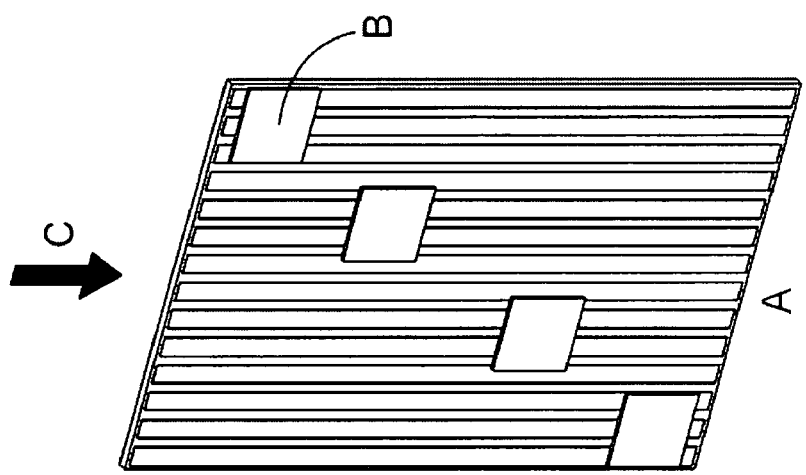
FIG. 6 is a schematic diagram illustrating an example of a semiconductor detector module according to another exemplary embodiment of the invention.

FIG. 6 is a schematic diagram illustrating an example of a semiconductor detector module according to another exemplary embodiment of the invention. This example illustrates a Multi Chip Module (A) where the ASICs (B) are spread out over the area of the sensor in order to minimize capacitance to the input of the ASICs. Capacitance increases the electronic noise which may have an unfavorable impact on image quality. Spreading out the ASICs over the semiconductor sensor means that the routing length, which is proportional to the capacitance, can be much shorter. The drawback with this arrangement is that the ASICs will be exposed to direct x-ray radiation (C) which may be harmful and also that the ASICs will take space and make impossible a very dense packing unless they are made very thin. It is even conceivable that the ASICs are merged to one large ASIC covering a larger part of the sensor or the whole semiconductor sensor. It should thus be understood that it is possible to employ implementations, where the semiconductor detector module only has a single integrated circuit.

FIG. 7 is a schematic diagram illustrating different examples of how semiconductor detector modules can be positioned next to each other with anti-scatter sheets positioned in-between detector modules. In this example it is indicated that several detector modules such as Multi Chip Modules (A) are positioned next to each other as in FIG. 5 with the sheets made of heavy material (B). The sheets may be positioned between every MCM as indicated to the left, or between for example every third as indicated to the right, depending on what optimizes the signal to noise level.

Figure 8:
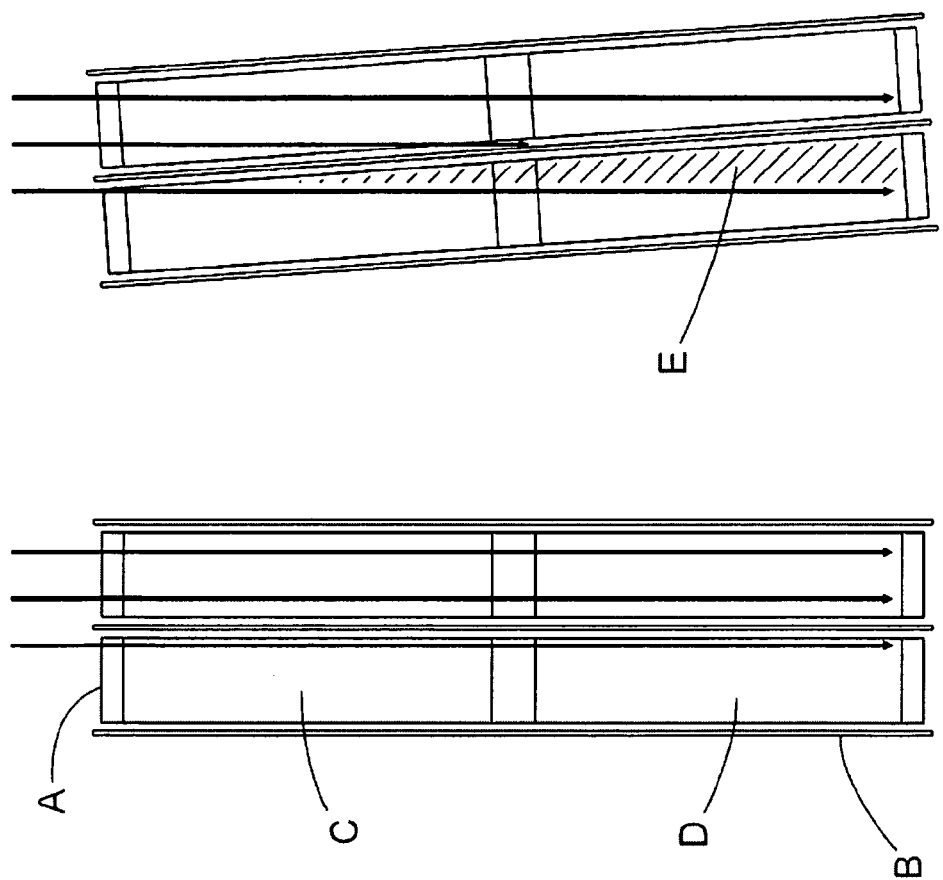
FIG. 8 is a schematic diagram illustrating an example of how semiconductor detector modules can be segmented in depth; in the direction of incoming x-rays.

FIG. 8 is a schematic diagram illustrating an example of how semiconductor detector modules can be segmented in depth; in the direction of incoming x-rays. This example illustrates semiconductor detector modules (A) with shield (B) and with depth segmentation with a top (C) and bottom (D) segment. To the left the semiconductor detector module is aligned relative to the incoming x-rays from the source. To the right the semiconductor detector module is misaligned relative to x-rays from the source. Mechanical alignment may be a challenge for long semiconductor detectors and misalignment may cause artifacts in the image since parts of the semiconductor sensor area may be shadowed by the interfolding heavy material sheets. A volume of the detector module which becomes shadowed (E) is indicated to the right. By segmenting the semiconductor detector module in depth this can be measured and corrected for. The expected ratio of detected x-rays in the top and bottom segments is reasonably well known for any object and x-ray imaging set-up. This knowledge can be used to normalize the measured ratio and this will efficiently suppress any artifacts.

For example, the length of the depth segments is chosen so that the count rate in the segment counting most x-rays is less than a factor 10 higher compared to the depth segment counting the median number of x-ray photons compared to the other segments.

The length of the depth segments may also be chosen so that the count rate in the segment counting least x-rays is less than a factor 10 less compared to the depth segment counting the median number of x-ray photons compared to the other segments.

Figure 9:
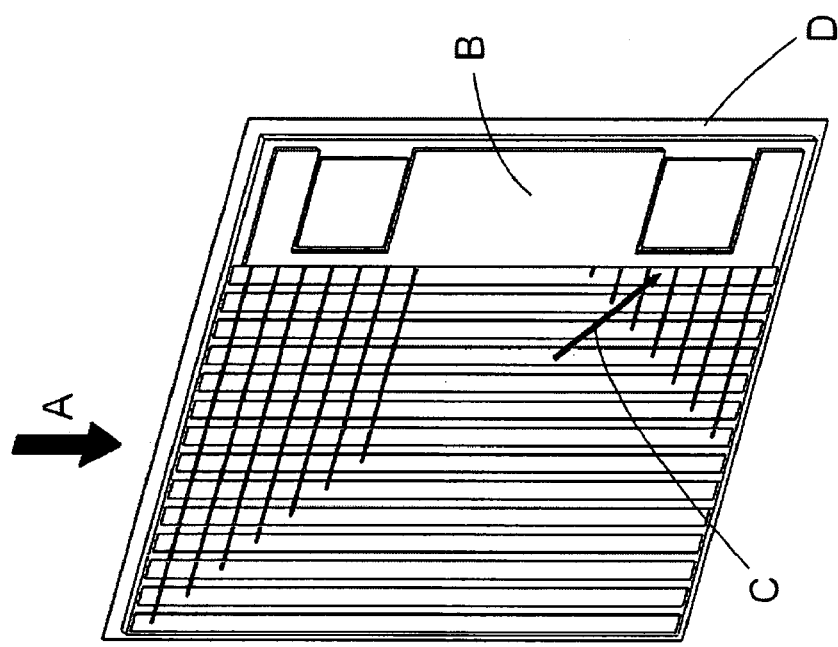
FIG. 9 is a schematic diagram illustrating an example of how the integrated circuits of a semiconductor detector module can be protected from ionizing radiation.

FIG. 9 is a schematic diagram illustrating an example of how the integrated circuits of a semiconductor detector module can be protected from ionizing radiation. The ASICs may be sensitive to ionizing radiation such as x-rays (A) and in this example it is shown how they can be very efficiently shielded by adding absorbers made of heavy material (B), such as Tungsten or Copper, between the irradiated volume and the said ASICs. The shielding material will thus protect the ASICs from radiation from above (A) and scattered from the side (C). The heavy material sheet (D) which is inserted primarily to absorb scattered x-rays in the semiconductor detectors and in the object will also serve as a radiation protection for the ASICs. As previously mentioned, to prevent x-rays which are Compton scattered in the semiconductor sensors to reach other semiconductor sensors a foil of x-ray absorbing material is interfolded between at least some of the detector modules. The foils should preferably be made in a heavy material with high atomic number such as Tungsten.

It has also been recognized that a particularly beneficial example implementation of the overall detector involves arrangement of the semiconductor detector modules in a number of levels, where the number of levels is equal to or greater than 2. The levels are also referred to as layers, and the overall detector structure is thus referred to as a layered detector, with the different layers arranged substantially in the direction of incoming x-rays.

For example, with two layers of semiconductor detector modules, a first set of detector modules are arranged in an upper layer and a second set of detector modules are arranged in a lower layer.

Preferably, detector modules of one of the layers are staggered (displaced) with respect to detector modules of another one of the layers in order to achieve an efficient geometrical coverage of active detector area and/or efficient resolution. Normally, the detector modules of one of the layers are arranged with a predetermined offset, in a direction substantially orthogonal to incoming x-rays, with respect to the detector modules of another layer to enable an efficient active detector area.

Figure 10B:
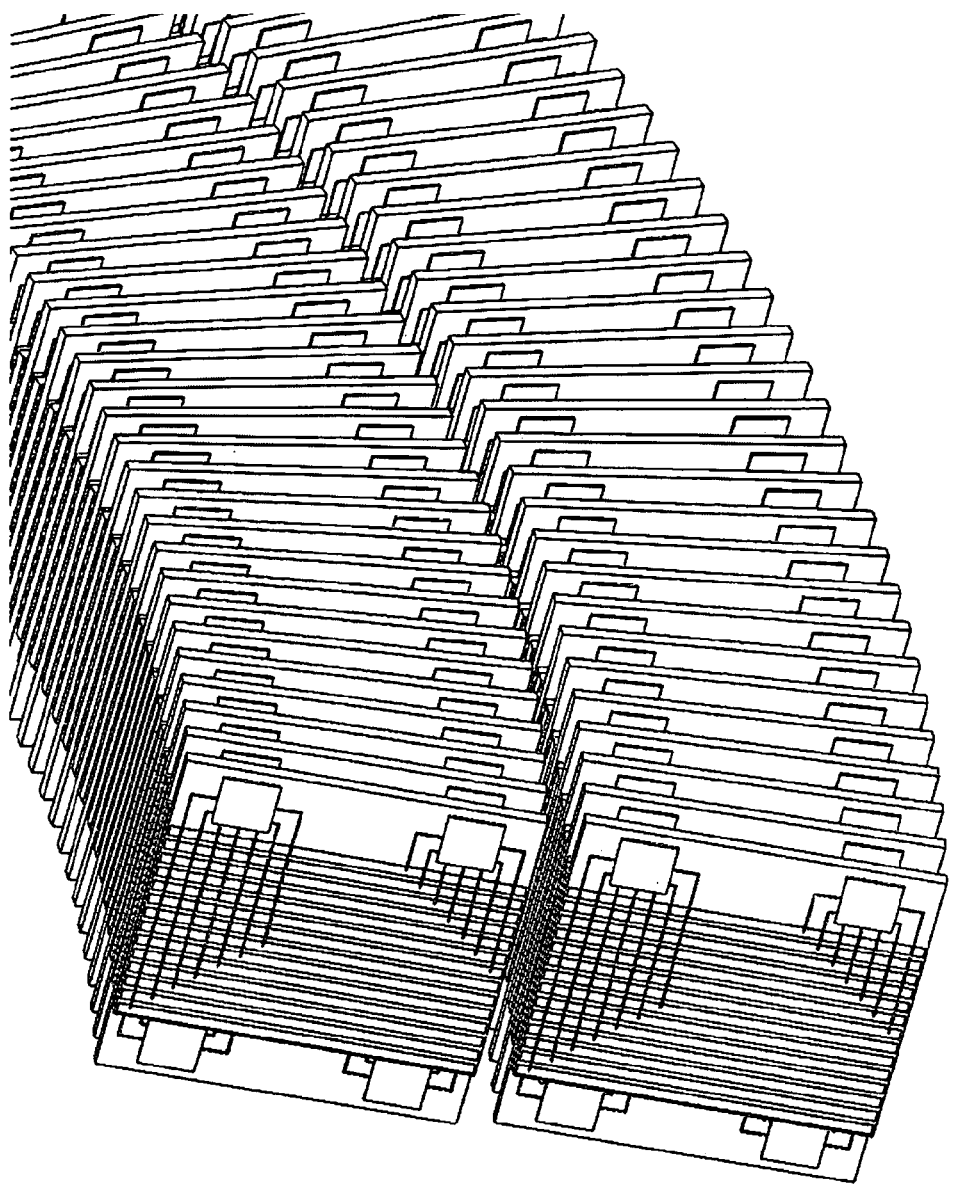
Figure 10C:
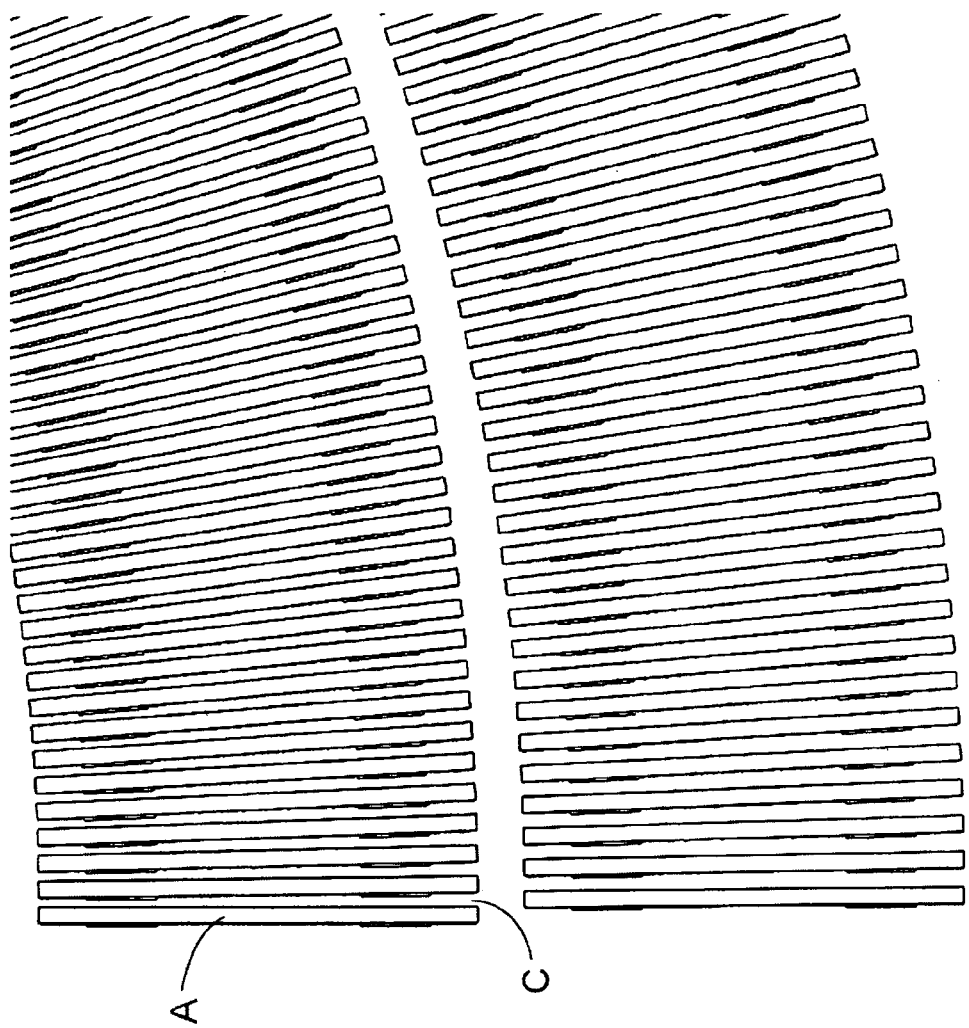

FIGS. 10a-c are different schematic views illustrating an example of the mechanical arrangement of semiconductor detector modules in two layers or levels (B) to allow for seamless tiling of the semiconductor detector modules. This example shows mechanical arrangement of detector modules such as MCMs (A) in two levels (B) to allow for seamless tiling of the semiconductor sensors. Also a magnified view is displayed both from two views. The space (C) between detector modules (e.g. MCMs) allows for efficient cooling of the ASICs which may consume significant power. Thermal expansion is accounted for since each MCM is attached separately and the expansion does not add up which would be the case if they were positioned in direct contact with each other side by side. The mechanical arrangement according to the figure also leaves room for connections for data transfer and for power. It also facilitates easy mounting and accurate alignment.

Although there is spacing between detector modules in any individual layer or level, the detector modules of the overall layered Silicon detector will be arranged or tiled with a minimum dead detector area in both directions orthogonal to incident x-rays.

The semiconductor detector modules are put in a mechanical jig/frame according to FIG. 10a-c where each semiconductor detector module including sensor is arranged for pointing back to the x-ray source which should also be true for the individual pixels in the semiconductor sensor of the detector module.

Figure 10D:
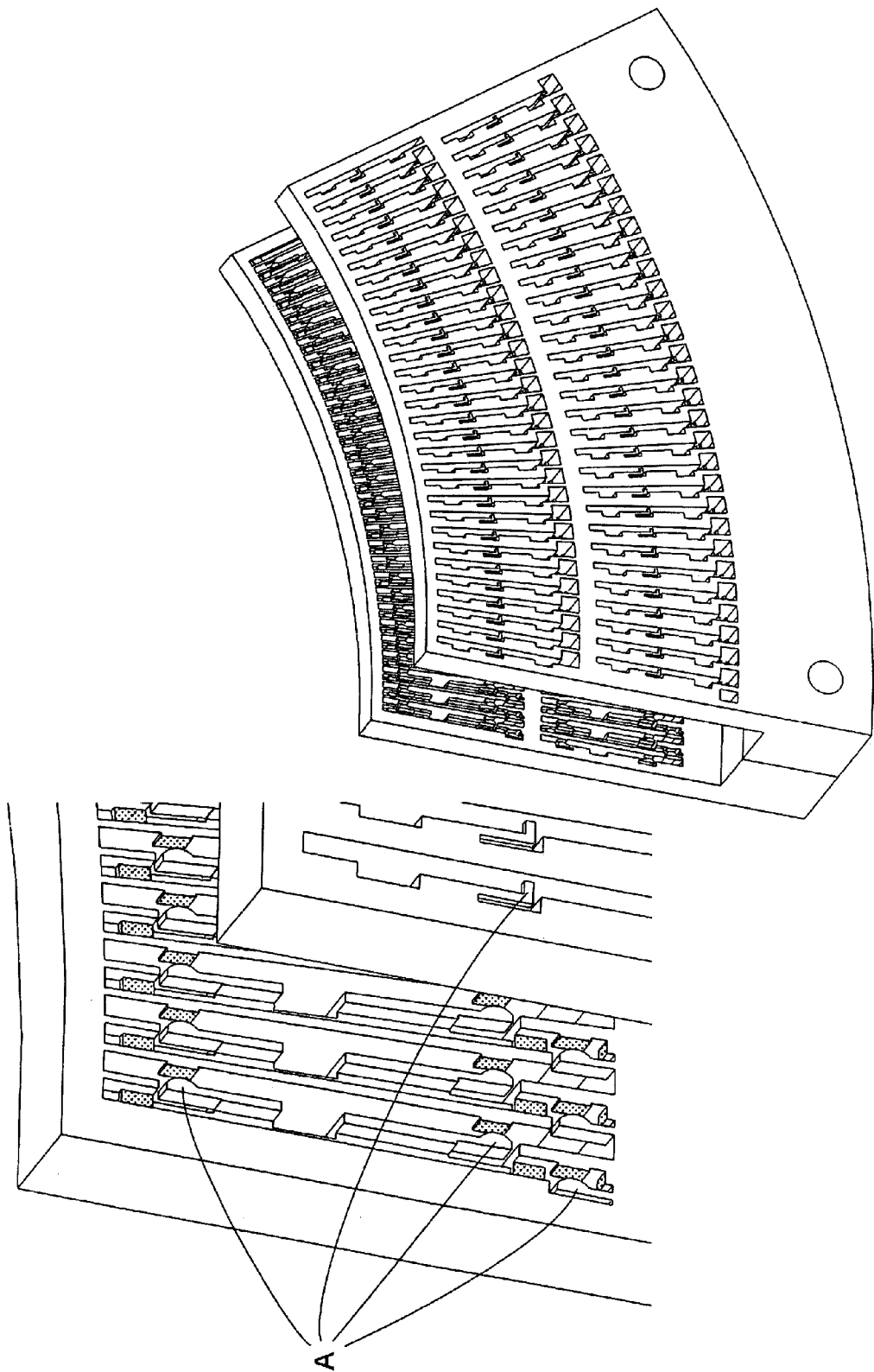
FIG. 10d illustrates an example of a mechanical frame for the semiconductor detector modules.

In a preferred example, the staggered multi (two or more) level arrangement provides means for the jig/frame to hold and precisely position each semiconductor detector module including the active sensor while maximum geometrical coverage of active detector area for the incident x-rays is enabled. Furthermore space for the ASICs and read-out electronics is provided. An example of a suitable mechanical frame for semiconductor detector modules is illustrated in FIG. 10d. Precision alignment features (dotted areas in FIG. 10d) for each semiconductor detector module (including sensor), preferably of kinematic type, is formed in the mechanical jig/frame. The semiconductor detector modules (including sensors) are held/secured/locked against these alignment features by holding arrangements/features (A), preferably of a resilient type. It must be emphasized that the solution shown in FIG. 10d is merely an example of a feasible solution. Anyway, an arrangement where the precision alignment of the semiconductor sensors is provided by the mechanical jig/frame ensures that all semiconductor sensors are held in a precisely known position and that said sensors individual tolerances does not add-up throughout the structure ruining their alignment. Still another advantage of the proposed multilevel arrangement is that only the eventual non active layers on the semiconductor detector modules (scatter shield, routing layer, passivation layer, etc.) on the top level need to be positioned in the x-ray beam, hence the geometric coverage of the active detector area can be increased even more.

Moreover thermal expansion of the jig/frame material itself in this arrangement do not need to be matched to the thermal expansion of the sensor material (here silicon) which means it can be made in a standard material such as Aluminum which can be easily processed to the desired shape and is readily available. The assembly also allows for efficient air cooling of the ASICs and MCMs when air is forced/blown through the space between the MCMs as a large surface area for heat transfer between the air and MCMs is present. The MCMs themselves functions as cooling fins.

FIG. 11 is a schematic diagram illustrating an example of how a full detector can be constructed in two halves and assembled together seamlessly in order to build a wider detector. This example shows that a full detector can be constructed in two halves (A) and assembled together seamlessly in order to build a wider detector as indicated also in a magnified view. This would increase cost and also the amount of scattered radiation from the object would increase which will increase noise. It may still be desirable though since a wider detector decreases image acquisition time which is important in imaging of moving objects such as the human heart.

Figure 12:
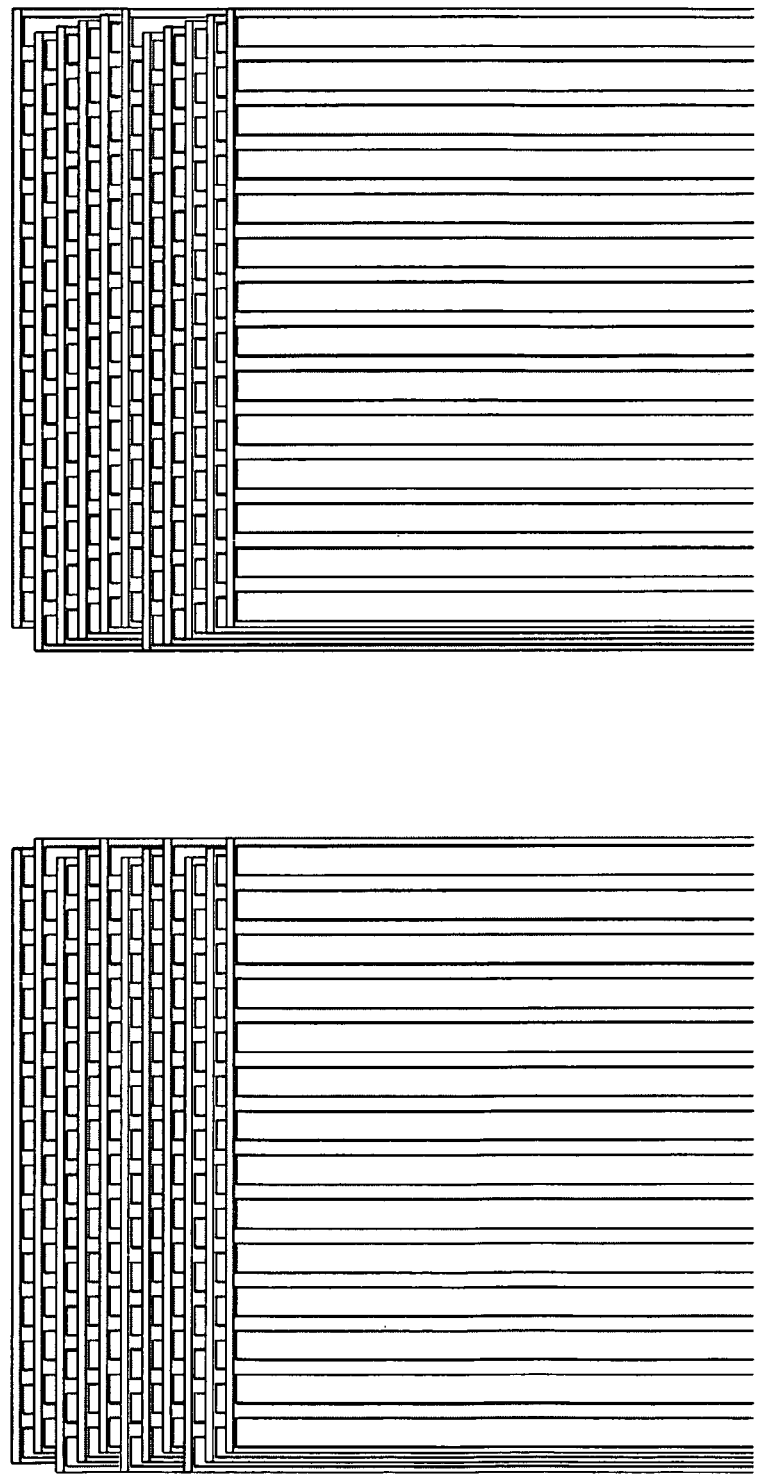
FIG. 12 is a schematic diagram illustrating examples of how semiconductor detector modules can be displaced relative to each other to optimize spatial resolution.

In order to increase spatial resolution the individual semiconductor sensors can be displaced relative to each other in the direction 90 degrees to the scan direction as indicated in FIG. 12. FIG. 12 is a schematic diagram illustrating examples of how semiconductor detector modules can be displaced relative to each other to optimize spatial resolution. In order to optimize spatial resolution for a scanned detector the mechanical arrangement of the semiconductor detectors orthogonal to scan direction may be displaced relative to each other with a known fraction (A) of the actual pixel size (B) of the semiconductor sensor. The figure shows two examples of this; one with every pixel is displaced with ⅓ (C) relative to adjacent detector pixel, one example with displacement of ⅕ (D). More generally, the offset may be between half a pixel and one tenth of a pixel.

The assembled detector according to above may be used for Computed Tomography but also for other imaging applications such as security screening and non-destructive testing.

Another embodiment of the invention places the ASICs on top of the semiconductor sensors, this arrangement would cut the required area for the MCM. Moreover, and more importantly it would cut the input capacitance to the ASIC which increases the performance and decreases the noise which is beneficial for image quality. The main challenge with this arrangement is that the ASICs will be exposed to the radiation which may create malfunctioning both in short and long term, this may however be mitigated with special design processes for the ASIC. A problem is also that in this configuration the ASICs will shadow the Semiconductor sensors positioned below and x-rays absorbed in the ASIC will only contribute to the dose and not to the image quality. This absorption may also cause artifacts in the image.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

U.S. Pat. No. 7,471,765 "Cone Beam Computed Tomography With A Flat Panel Imager" (radiotherapy)

U.S. Pat. No. 4,785,186 "Amorphous Silicon Ionizing Particle Detectors" (Xerox)

Börje Norlin, "Characterisation and application of photon counting X-ray detector systems" Mid Sweden University Doctoral Thesis 26, ISSN 1652-893X, ISBN 978-91-85317-55-4 Electronics Design Division, in the Department of Information Technology and Media Mid Sweden University, SE-851 70 Sundsvall, Sweden M. G. Bisogni, A. Del Guerra, N. Lanconelli, A. Lauria, G. Mettivier, M. C. Montesi, D. Panetta, R. Pani, M. G. Quattrocchi, P. Randaccio, V. Rosso and P. Russo "Experimental study of beam hardening artifacts in photon counting breast computed tomography" Nuclear Instruments and Methods in Physics Research Section A: Accelerators, Spectrometers, Detectors and Associated Equipment Volume 581, Issues 1-2, 21 Oct. 2007, Pages 94-98

V. Rosso, N. Belcari, M. G. Bisogni, C. Carpentieri, A. Del Guerra, P. Delogu, G. Mettivier, M. C. Montesi, D. Panetta, M. Quattrocchi, P. Russo and A. Stefanini "Preliminary study of the advantages of X-ray energy selection in CT imaging" Nuclear Instruments and Methods in Physics Research Section A: Accelerators, Spectrometers, Detectors and Associated Equipment, Volume 572, Issue 1, 1 Mar. 2007, Pages 270-273

M. Danielsson, H. Bornefalk, B. Cederström, V. Chmill, B. Hasegawa, M. Lundqvist, D. Nygren and T. Tabár, "Dose-efficient system for digital mammography", *Proc. SPIE, Physics of Medical Imaging*, vol. 3977, pp. 239-249 San Diego, 2000

R. Nowotny "Application Of Si-Microstrip-Detectors In Medicine And Structural Analysis" Nuclear Instruments and Methods in Physics Research 226 (1984) 34-39

Shoichi Yoshida, Takashi Ohsugi "Application of silicon strip detectors to X-ray computed tomography" Nuclear Instruments and Methods in Physics Research A 541 (2005) 412-420

U.S. Pat. No. 5,889,313 Sherwood Parker "Three dimensional architecture for solid state radiation detectors" 1999

U.S. Pat. No. 4,937,453 Robert Nelson "X-ray detector for radiographic imaging" (edge-on)

U.S. Pat. No. 5,434,417 David Nygren "High resolution energy-sensitive digital X-ray"

US2004/0251419 patent application, Robert Nelson

The invention claimed is:

1. A Silicon detector for x-ray imaging of an object, wherein said detector is based on multiple semiconductor detector modules arranged together to form an overall detector area, each semiconductor detector module comprising an x-ray sensor of crystalline Silicon oriented edge-on to incoming x-rays and connected to integrated circuitry for registration of x-rays interacting in said x-ray sensor through the photoelectric effect and through Compton scattering and for an incident x-ray energy between 40 keV and 250 keV providing the spatial and energy information from these interactions to enable an image of said object, wherein anti-scatter modules are interfolded between at least a subset of said semiconductor detector modules to at least partly absorb Compton scattered x-rays.

2. The Silicon detector of claim 1, wherein said anti-scatter modules are arranged to at least partly absorb Compton scattered x-rays from said object and at least partly prevent Compton scattered x-rays in a semiconductor detector module to reach another semiconductor detector module.

3. The Silicon detector of claim 1, wherein each of said anti-scatter modules includes a foil made of an elemental composition with an average atomic number exceeding 25 and a thickness less than 200 μm to prevent most of the Compton scattered x-rays in a semiconductor detector module to reach an adjacent detector module.

4. The Silicon detector of claim 1, wherein said anti-scatter modules are interfolded between every detector module, every second detector module, every third detector module or any number of detector modules per interfolding foil less than 10, depending on desired signal to noise level.

5. The Silicon detector of claim 1, wherein said integrated circuitry is configured to enable energy of each x-ray to be deduced based on the combined information of deposited energy in the corresponding x-ray sensor and the depth of interaction of the x-ray.

6. The Silicon detector of claim 1, wherein each of said semiconductor detector modules is implemented as a Multi Chip Module (MCM), and said integrated circuitry comprises at least two integrated circuits, and said integrated circuits are flip-chip mounted.

7. The Silicon detector of claim 6, wherein said integrated circuits are configured to process electrical charge generated from each x-ray to convert the charge into digital data, and said integrated circuitry is configured for connection to image processing circuitry for reconstruction of said image of said object.

8. The Silicon detector of claim 1, wherein said x-ray sensor is divided into a plurality of pixels in a direction orthogonal to the depth direction, assuming that x-rays enter through the edge of the x-ray sensor.

9. The Silicon detector of claim 1, wherein said semiconductor detector modules are sub-divided into at least two depth segments to make it feasible to handle high rates of incoming x-rays.

10. The Silicon detector of claim 9, wherein the length of the depth segments is chosen so that the count rate in the segment counting most x-rays is less than a factor 10 higher compared to the depth segment counting the median number of x-ray photons compared to the other segments.

11. The Silicon detector of claim 9, wherein the length of the depth segments is chosen so that the count rate in the segment counting least x-rays is less than a factor 10 less compared to the depth segment counting the median number of x-ray photons compared to the other segments.

12. The Silicon detector of claim 9, wherein each of said sub-segments is connected to means for measuring the energy deposition for each x-ray interaction.

13. The Silicon detector of claim 9, wherein data processing circuitry is configured for calculating an improved energy estimate for any incident x-ray based on combining the energy as measured by the integrated circuitry with knowledge of in which depth segment the interaction took place.

14. The Silicon detector of claim 9, wherein data processing circuitry is configured for summing together events in several depth segments for the overall pixel data.

15. The Silicon detector of claim 9, wherein data processing circuitry is configured for comparing the count rate in upper and lower depth segments to an expected ratio for any x-ray energy and using the result to correct for alignment errors.

16. The Silicon detector of claim 1, wherein said semiconductor detector modules are arranged in a number of layers, where the number of layers is equal to or greater than 2.

17. The Silicon detector of claim 16, wherein said layers are arranged to obtain a layered Silicon detector in the direction of incoming x-rays.

18. The Silicon detector of claim 16, wherein a first set of said detector modules are arranged in an upper layer and a second set of said detector modules are arranged in a lower layer.

19. The Silicon detector of claim 16, wherein the detector modules of one of said layers are staggered with respect to the detector modules of another one of said layers to enable an efficient active detector area.

20. The Silicon detector of claim 19, wherein the detector modules of one of said layers are arranged with a predetermined offset, in a direction substantially orthogonal to incoming x-rays, with respect to the detector modules of another one of said layers.

21. The Silicon detector of claim 19, wherein detector modules of an individual layer are arranged with spacing between each other to allow for thermal expansion and cooling and electric connections.

22. The Silicon detector of claim 21, wherein said semiconductor detector modules are arranged in a mechanical frame, where each semiconductor detector module including sensor are arranged for pointing back to an intended x-ray source, and precision alignment features are provided in the mechanical frame for each semiconductor detector module to hold and precisely position each semiconductor detector module while a maximum geometrical coverage of active detector area for incoming x-rays is enabled.

23. The Silicon detector module of claim 22, wherein the semiconductor detector modules are secured in relation to the precision alignment features by corresponding holding features.

24. The Silicon detector of claim 1, wherein said semiconductor detector modules are arranged in association with shielding material in such a way that the integrated circuitry is shielded from incident x-rays.

25. The Silicon detector of claim 1, wherein said semiconductor detector modules are arranged in association with said anti-scatter modules in such a way that the integrated circuitry is shielded from x-rays scattered in the silicon detector.

26. The Silicon detector of claim 1, wherein said semiconductor detector modules are arranged in such a way that tiling of detector modules with a minimum dead area is allowed in both directions orthogonal to incident x-rays.

27. The Silicon detector of claim 1, wherein said Silicon detector is configured for scanning relative to the object, and said semiconductor detector modules are arranged in such a way that they are offset relative to each other by a known fraction of the pixel size in a direction orthogonal to a scanning direction of the Silicon detector.

\* \* \* \* \*